Jan. 27, 1925.
G. W. ANDERSON
1,524,377
QUICKLY DETACHABLE SIGN HOLDER FOR RADIATORS OF MOTOR VEHICLES
Filed Feb. 26, 1924
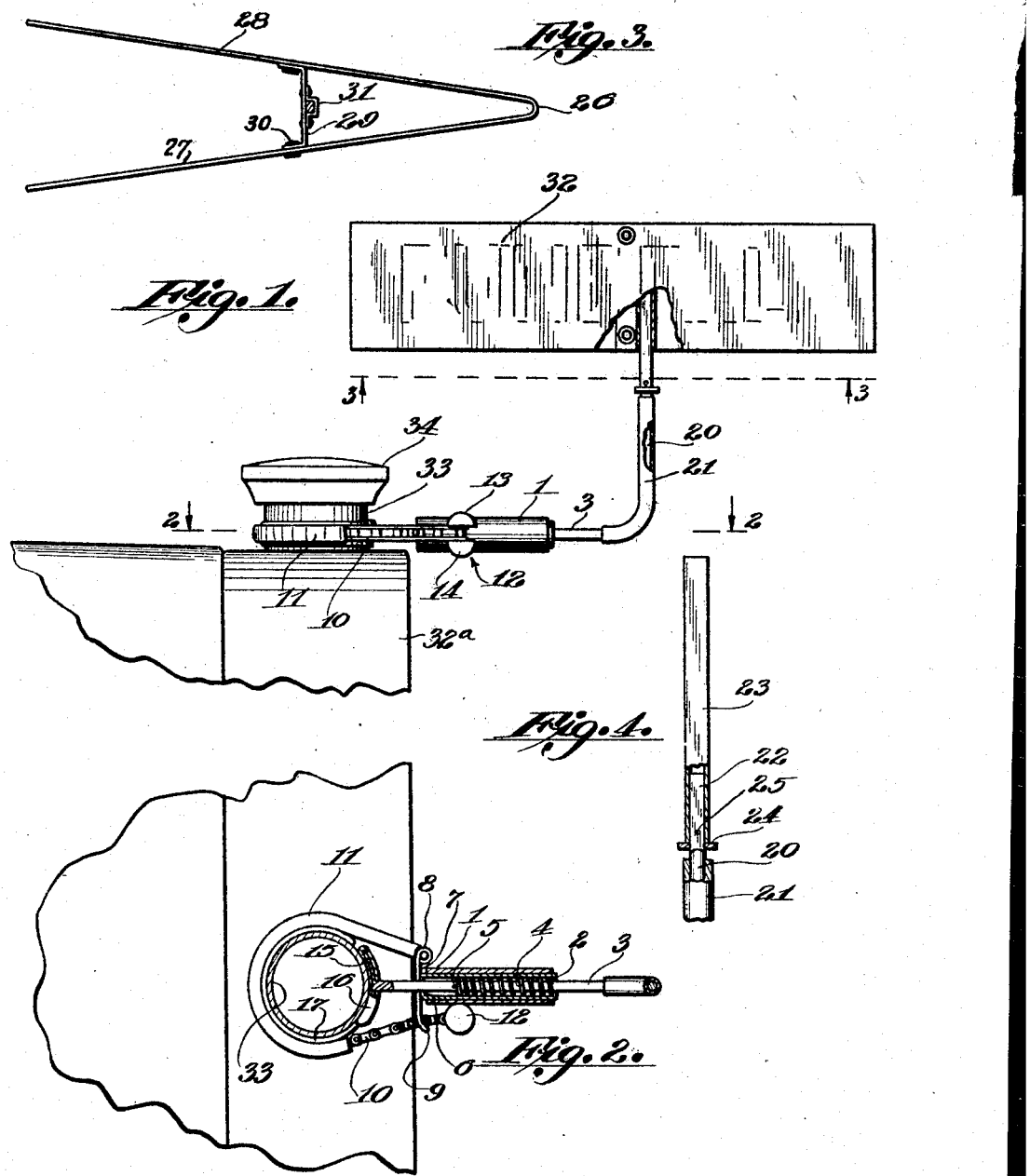
Inventor
G. W. Anderson
by Hazard and Miller
Attys Patented Jan. 27, 1925.

1,524,377

UNITED STATES PATENT OFFICE.

GEORGE W. ANDERSON, OF LOS ANGELES, CALIFORNIA.

QUICKLY-DETACHABLE SIGN HOLDER FOR RADIATORS OF MOTOR VEHICLES.

Application filed February 26, 1924. Serial No. 695,349.

*To all whom it may concern:*

Be it known that I, GEORGE W. ANDERSON, a citizen of the United States, residing at Los Angeles, in the county of Los Angeles and State of California, have invented new and useful Improvements in Quickly-Detachable Sign Holders for Radiators of Motor Vehicles, of which the following is a specification.

My invention relates to sign holders and consists of the novel features herein shown, described and claimed.

An object of my invention is to make a sign holder which may be quickly attached to or detached from a radiator or the like.

Fig. 1 is a view in elevation showing a fragment of a radiator with my sign holder attached to the filling nipple of the radiator and carrying a sign, parts of the sign being broken away and shown in sections.

Fig. 2 is a horizontal sectional detail on the line 2—2 of Fig. 1 and looking downwardly.

Fig. 3 is a horizontal sectional detail on the line 3—3 of Fig. 1 and looking upwardly.

Fig. 4 is a fragmentary enlarged detail of the extension arm to which the sign is directly applied, parts being broken away and shown in sections.

Referring to Fig. 2, the casing 1 has a flange 2 at its forward end forming a bearing for a rod 3 and a seat for the expansion spring 4. A pin 5 is fixed in the rod 3 to bear against the opposite end of the spring 4 from the flange 2. A second flange 6 is formed at the opposite end of the casing 1 from the flange 2 and the rod 3 slides through this second flange. A cross bar 7 is fixed to the flange 6 and has an eye 8 upon one end and a hook 9 upon the other end, the rod 3 also passing through the cross bar 7. A chain 10 is connected to the eye 8 and a covering 11 of soft rubber or the like extends upon the chain 10 from the eye 8 a part of the length of the chain to keep the chain from marring things to which it is attached. A handle 12 is connected to the free end of the chain 10, said handle having a shaft which extends through a link of the chain, and hemispherical knobs 13 and 14 on the ends of the shaft, said knobs being fairly hard rubber or the like so that they will not scratch or mar the piece with which the knob comes in contact.

A curved clamping bar 15 is fixed to the inner end of the rod 3 and has a soft cover of leather or the like 16 and a strap 17 extending from one end of the cover 16. The vertical arm 20 is formed integral with the rod 3 by bending the material of which the rod and arm are formed, there being a cover 21 of rubber tubing or the like upon the arm 20, the upper end of the arm 20 being squared to produce the socket engaging member 22, and the extension arm 23 is made of square tubing fitted upon the extension 22 and having a stop washer 24 at its lower end and secured in place by a pin 25. The sign shown is a long strap of sheet metal bent at its center 26 to form the side plates 27 and 28.

A brace 29 is inserted between the sides 27 and 28 near the longitudinal centers and secured in place by rivets or eyelets 30 and a socket member 31 is secured to the brace 29 to make a square socket to receive the extension 23 and engage the stop 24. The signs, symbols or indicators 32 may be formed upon or attached to the outer faces of the plates 27 and 28.

The radiator 32ª has a filling nipple 33 and a removable cap 34. In applying the sign holder to the nipple 33 the clamping member 15 presses against the nipple 33 and the cushioned strap 17 is wrapped around the nipple and the cushioned chain 10 is wrapped around the outside of the strap 17. The parts are operated to compress the spring 4 and the chain is applied to the hook 9, the tension of the spring 4 serving to hold the parts tight upon the radiator and nipple.

While I have shown the rod 3 extending straight forwardly from the radiator and the side plates 27 and 28 equal distances from the line of the rod 3 with the point 26 at the front, it is obvious that the rod 3 may extend in any desired direction by swinging the rod and clamping means around the nipple 33.

While I have shown the sign holder attached to the radiator nipple, it is obvious that it may be attached to various other things and wherever a sign is desired, either temporarily or permanently.

Any suitable flexible member, such as a leather strap, may be substituted for the chain 10, and the cross bar 7 may be spring pressed away from the clamping bar 15 in various ways. Thus I have produced a quickly attachable or detachable sign holder comprising the combination with a sign member having a vertical socket, a vertical post fitting the socket, a rod extending laterally from the lower end of the post, a clamping member rigid on the rod, a cross bar sliding on the rod and spring pressed away from the clamping member, and a flexible member connected to one end of the cross bar and adapted to be adjustably connected to the other end of the cross bar so that the clamping member may be placed against a support and the flexible member passed around the support and connected to the cross bar to hold the sign upon the support.

Various changes may be made without departing from the spirit of my invention as claimed.

I claim:

1. A quickly attachable or detachable sign holder comprising the combination with a sign member having a vertical socket, a vertical post fitting the socket, a rod extending laterally from the lower end of the post, a clamping member rigid on the rod, a cross bar sliding on the rod and spring pressed away from the clamping member, and a flexible member connected to one end of the cross bar and adapted to be adjustably connected to the other end of the cross bar so that the clamping member may be placed against a support and the flexible member passed around the support and connected to the cross bar to hold the sign upon the support.

2. The combination with a radiator having a filling nipple, of a quickly attachable or detachable sign holder comprising a vertical post, a sign member mounted upon the vertical post, a rod extending laterally from the lower end of the post, a clamping member rigid on the rod engaging the radiator nipple, a cross bar sliding on the rod and spring pressed away from the clamping member, a flexible member connected to one end of the cross bar and passing around the radiator nipple and adjustably connected to the other end of the cross bar.

3. The combination with a radiator having a filling nipple, of a quickly attachable or detachable sign holder comprising a vertical post, a sign member mounted upon the vertical post, a rod extending laterally from the lower end of the post, a clamping member rigid on the rod engaging the radiator nipple, a cross bar sliding on the rod and spring pressed away from the clamping member, a flexible member connected to one end of the cross bar and passing around the radiator nipple and adjustably connected to the other end of the cross bar, the parts being cushioned with soft material to prevent marring the radiator and nipple.

4. In a sign support, a supporting rod, a clamping member rigid with the inner end of the supporting rod, a cross bar slidingly mounted on the supporting rod and spring pressed away from the clamping member, and a flexible member connected to one end of the cross bar and adjustably connected to the other end of the cross bar.

In testimony whereof I have signed my name to this specification.

GEORGE W. ANDERSON.